Figure 1:
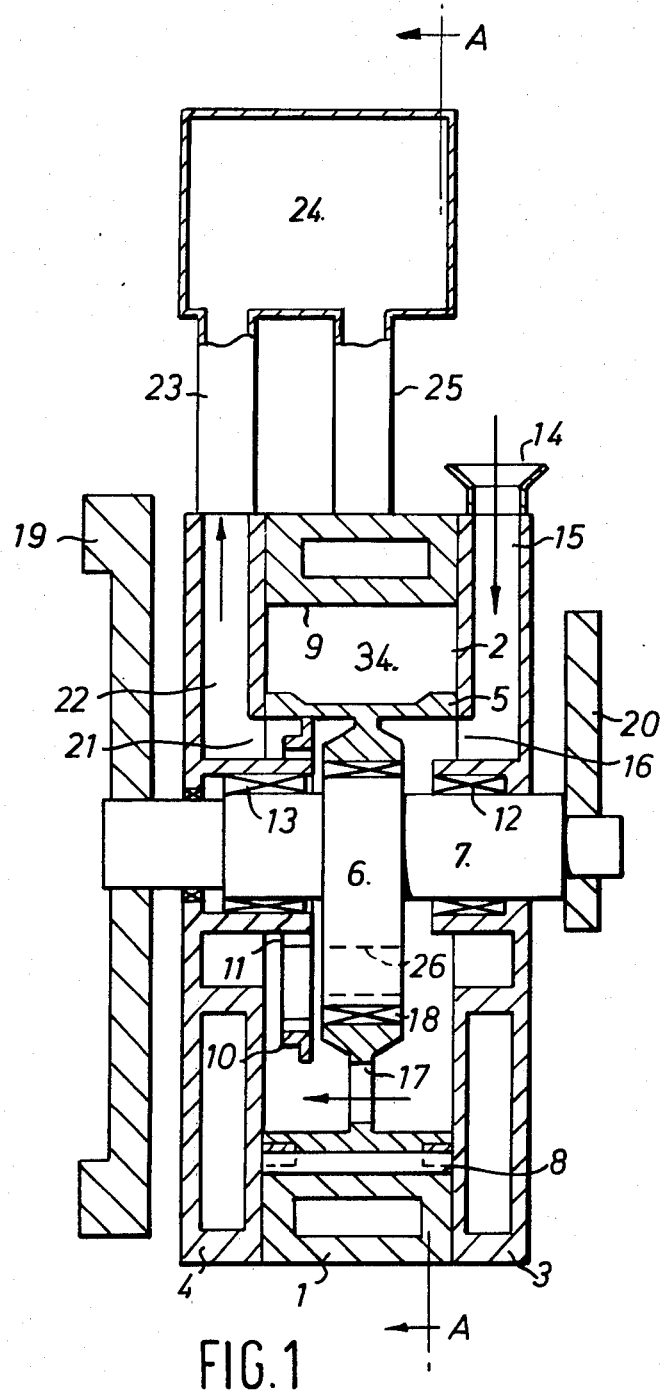

United States Patent [19]
Garside

[11] 3,967,593
[45] July 6, 1976

[54] ROTARY PISTON INTERNAL COMBUSTION ENGINES

[75] Inventor: David Walker Garside, Solihull, England

[73] Assignee: Birmingham Small Arms Company Limited, Birmingham, England

[22] Filed: Oct. 29, 1974

[21] Appl. No.: 518,876

[52] U.S. Cl. .................................. 123/8.45; 418/86
[51] Int. Cl.² .......................................... F02B 55/06
[58] Field of Search ............. 123/8.01, 8.45; 418/86

[56] References Cited
UNITED STATES PATENTS
2,298,525  10/1942  Briggs .............................. 418/86 X FOREIGN PATENTS OR APPLICATIONS
1,576,200  5/1970  Germany .............................. 418/86
1,186,460  4/1970  United Kingdom .................... 418/86

Primary Examiner—Carlton R. Croyle
Assistant Examiner—Michael Koczo, Jr.
Attorney, Agent, or Firm—Norris & Bateman

[57] ABSTRACT

Rotary piston engines of the kind in which the air inducted into the working chambers of the engine passes through an induction passage which is formed in part in the rotary piston of the engine, the rotary piston thereby being cooled by the air flow therethrough, a member is secured to the main engine housing which forms an air reservoir chamber having at least the same and preferably twice the volumetric displacement of the engine in the induction passage between the part thereof formed in the rotor and an inlet port to the working chambers.

15 Claims, 7 Drawing Figures

ROTARY PISTON INTERNAL COMBUSTION ENGINES

This invention relates to rotary piston internal combustion engines of the kind in which a rotary piston, or so-called rotor, rotates within a cavity of a housing, said rotor and the walls of the cavity being so shaped that working chambers are formed therebetween which vary in volume as the rotor rotates. For example, an engine of the kind referred to comprises a stationary housing having a two lobed epitrochoidal cavity and a rotor of substantially equilateral triangular shape but with arcuate convex sides, the rotor rotating in planetary manner within the cavity.

One method of cooling the rotor of an engine of the kind referred to is to form one or more passageways in said rotor which form a part of the induction passage to the working chambers of the engine such that the inducted air is drawn through, and thereby cools, the rotor. After the inducted air has passed through the rotor it is conventionally transferred to the working chambers of the engine through a transfer passage formed in the housing which communicates with an inlet port to the working chambers. Such transfer passages, being formed within the housing of the engine are, of necessity, of limited internal volume.

A disadvantage of the above referred to cooling system is that the passageways through the rotor are of comparatively limited cross sectional area and restrict the flow of air to the working chambers particularly when the engine is running at high power output.

It is an object of the invention to provide an engine of the kind referred to in which inducted air flows through and cools the rotor but in which the air supply to the working chambers of the engine is less retricted.

According to the invention a rotary piston engine comprises a housing, a cavity formed within the housing, a rotor rotatably mounted within the cavity, the peripheral wall of the cavity and the rotor being so shaped that working chambers are formed therebetween which vary in volume as the rotor rotates, an inlet port and an exhaust port in the housing whereby gases may be respectively admitted to and exhausted from the working chambers, an air passageway in the housing, at least one passageway through the rotor which communicates with the air passageway in the housing, and a member secured to the housing having an internal air reservoir chamber which communicates with the air passageway in the housing and with the inlet port whereby air inducted into the working chambers passes in sequence through the passageway in the rotor, the passageway in the housing, the air reservoir chamber and the inlet port.

The working chambers of the engine induct air in periodic aspirations and the provision of the air reservoir chamber between the inlet port and the part of the induction passage comprised by the passageways in the rotor and the housing provides a reservoir of air for such induction aspirations, the reservoir being replenished by a more continuous even flow of air through the passageway or passageways in the rotor. The air reservoir chamber thereby enables the periodic induction aspirations to be averaged into a lower rate of air flow through the rotor passageway or passageways and thereby at least partially offsets the limited ability of the rotor passageway or passageways to pass air and thus reduces the tendency of the rotor passageway or passageways to restrict the induction of air into the working chambers of the engine. The volume of the chamber must be sufficient to form an adequate air reservoir and will not normally be less than the volumetric displacement of the engine and preferably will be at least twice the volumetric displacement of the engine.

The member forming the air reservoir chamber will normally be connected by a first pipe to the passageway formed in the housing and by a second pipe to the inlet port. In some cases it may be possible to use pipes of a sufficiently large cross-section that their internal volume constitutes the air reservoir chamber, a single pipe merely interconnecting the passageway in the housing with the inlet port.

I prefer to incorporate in the engine according to the invention the feature described in our U.S. patent application Ser. No. 271812 whereby a carburettor is disposed in the induction passage so as to dispense fuel into the induction air stream after it has passed through the rotor. With such an arrangement the inducted air flows through the passageway or passageways in the rotor, into the air reservoir chamber, through the carburettor which is conveniently secured to the outlet from said chamber and through a pipe connecting the carburettor to the inlet port of the engine.

The pipe connecting the carburettor to the inlet port is preferably of a length and diameter tuned to provide optimum performance for a chosen engine speed.

In the case of multi-rotor engines separate induction passages will be formed through each rotor and its associated portion of the housing and these separate induction passages may be connected to a common air reservoir chamber which is in turn connected to all the inlet ports. Alternatively each of the separate induction passages may have an individual air reservoir chamber which is connected to the inlet port associated with the induction passage.

I have found with a particular twin rotor engine that the use of a common air-reservoir chamber results in greater torque at high engine speeds than is obtained with individual air reservoir chambers and conversely that individual air reservoir chambers result in greater torque at low engine speeds than is obtained with a common air reservoir chamber. Advantage may be taken of this characteristic by having a common air reservoir which is divided into two parts having a valved interconnection therebetween, each part being connected to one of the two inlet ports. The valve is opened at an intermediate engine speed such that at low engine speeds there are two separate air reservoir chambers and at high engine speeds a common air reservoir chamber. A similar variation in the torque characteristics can be obtained by varying the volume of an air reservoir feeding a single rotor. The variation in volume is conveniently achieved by dividing the chamber into two parts which have a valved interconnection therebetween, the opening and closing of the valve interconnection effecting the desired variation in volume and torque characteristics. It should be understood that these particular torque characteristics are incidental to the main advantage of the invention of reducing the restriction of air supply to the working chambers of the engine, particularly at high power, and will not necessarily be apparent with engines of different configurations.

In certain instances it may be advantageous to augment the normal induction air stream flowing through the rotor when the engine is operating at high load with air inducted direct from atmosphere, which feature forms the subject matter of our U.S. patent application Ser. No. 271814, now abandoned.

This is conveniently arranged in the engine according to the invention by providing the air reservoir chamber with a valved inlet which allows air to be drawn into said chamber directly from atmosphere when the engine is operating at high load. The valve of said valved inlet may be pressure operated such that it opens when the pressure within the chamber drops below atmospheric pressure by a predetermined amount, for example 10 inches of Water Gauge. Alternatively the valve may be manually operated and may, for example, be linked to the carburettor operating linkage such that the valve is opened when the engine is operating on full throttle.

In my U.S. patent application Ser. No. 271813 now abandoned and replaced by continuation application Ser. No. 529,085 filed Dec. 3, 1974, I describe a feature of an engine of the kind referred to whereby a heat exchanger is positioned in the induction passageway to cool the warmed air leaving the passageways through the rotor before it is inducted into the working chamber of the engine. It will be understood that the air reservoir chamber of the engine according to the invention may readily accomplish the function of a heat exchanger. Simply making the air reservoir chamber of a material with a high thermal conductivity, for example a metal, will in many cases be sufficient to achieve the desired rate of heat exchange between the induction air flow and atmosphere but in other cases it may be necessary to provide the air reservoir chamber with external and/or internal cooling fins.

When the engine according to the invention is used as a prime mover for a vehicle a suitable structural chamber of the vehicle may constitute the air reservoir chamber. For example, when used on a motor cycle, one or more of the tubular frame members of the motor cycle may constitute the air reservoir chamber.

Figure 2:
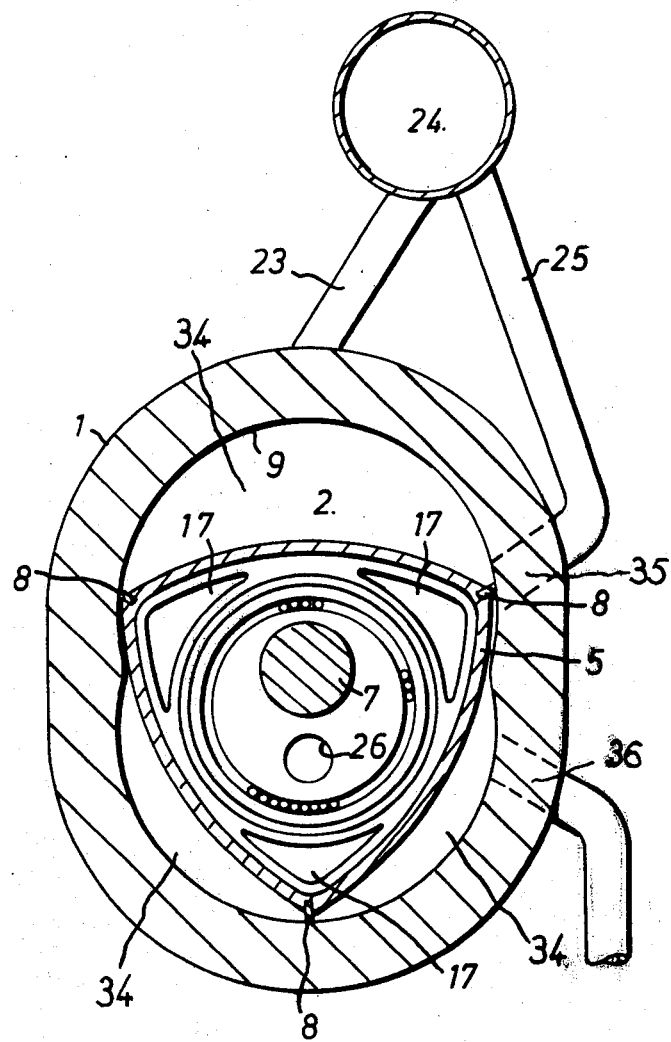
Figure 3:
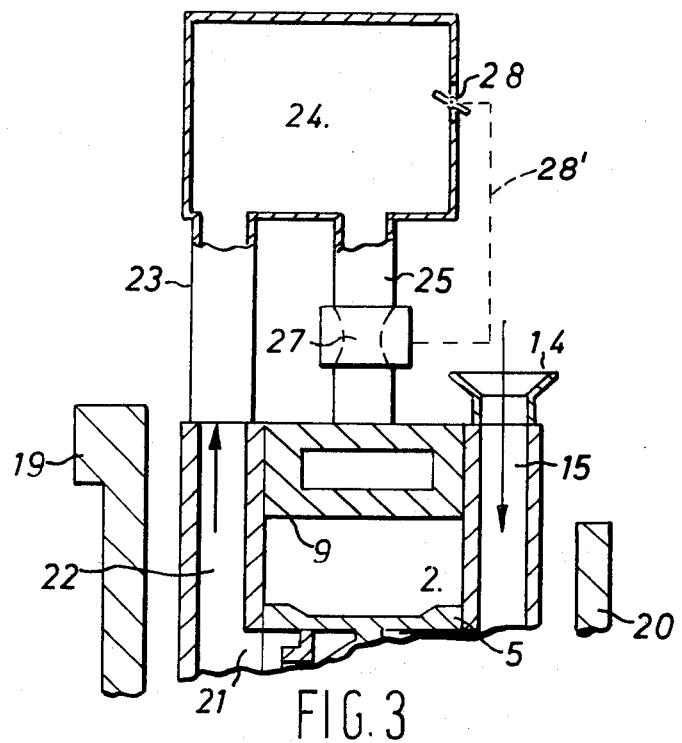
Figure 4:
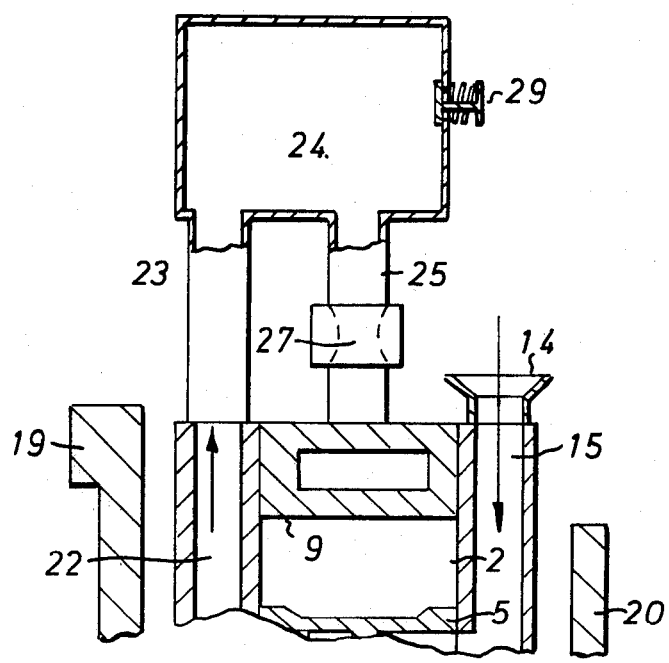
Figure 5:
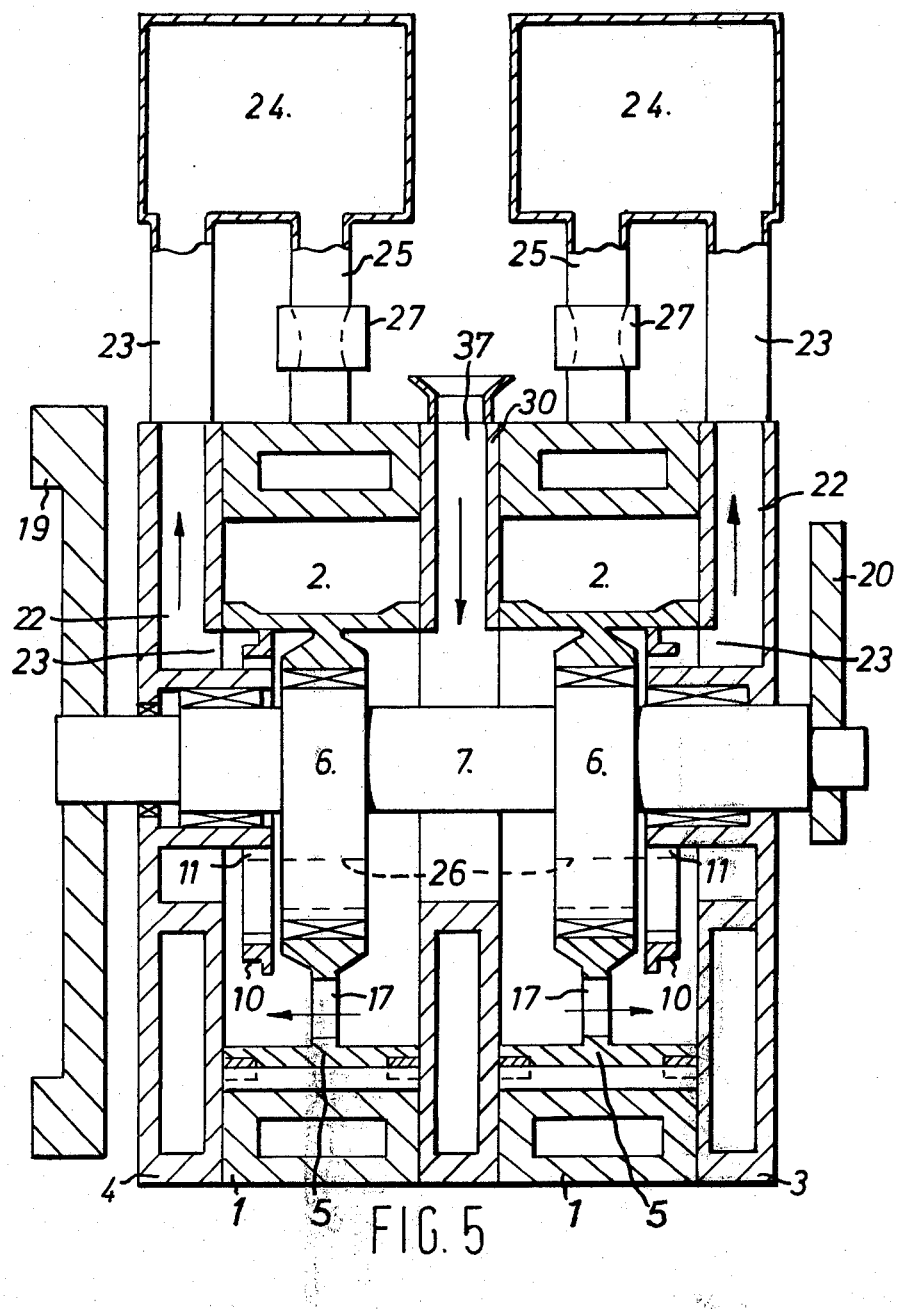
Figure 6:
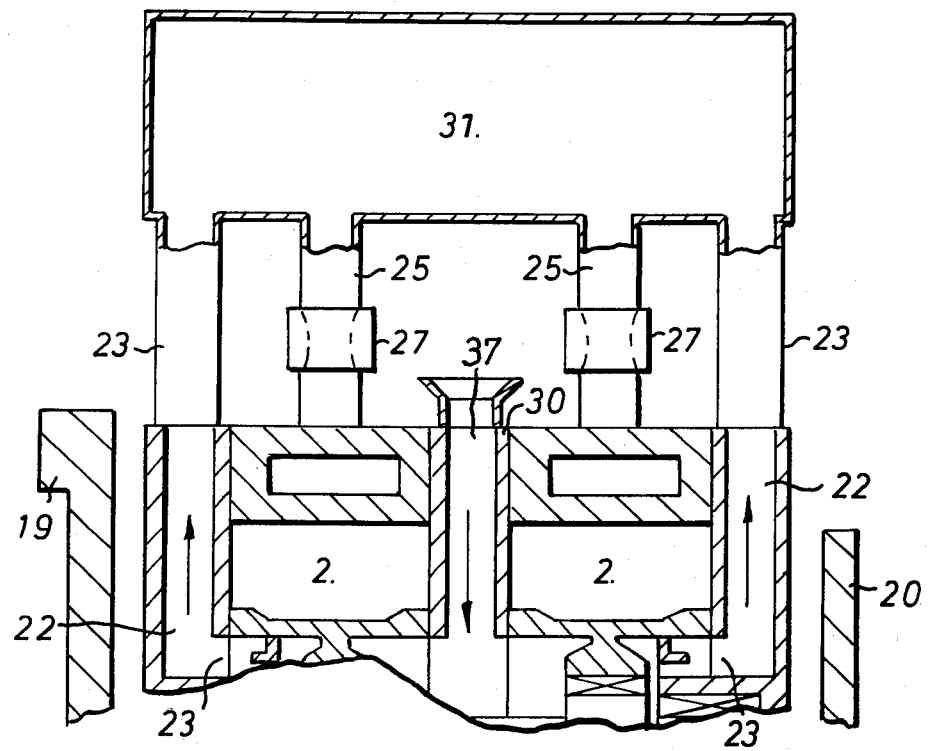
Figure 7:
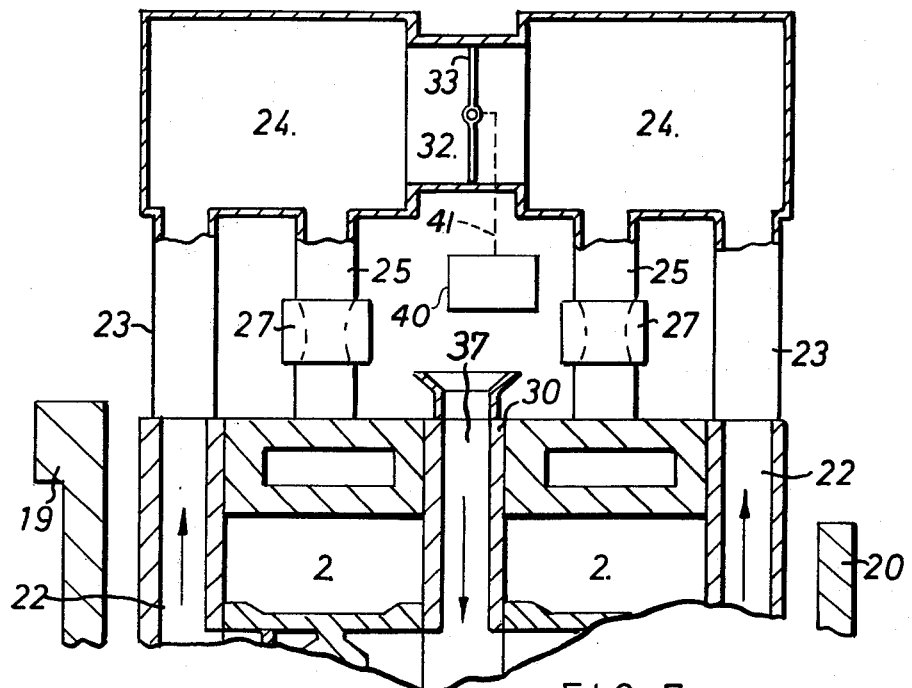

Embodiments of the invention will now be described, by way of example, with reference to the accompanying drawings in which like reference numbers refer to like parts and in which:

FIG. 1 is a diagrammatic cross-section through an engine according to the invention, FIG. 2 is a cross-section along the line A—A of FIG. 1, FIG. 3 is a diagrammatic part cross-section through an engine being a modification of the engine shown in FIG. 1, FIG. 4 is a diagrammatic part cross-section through an engine being an alternative modification of the engine shown in FIG. 1, FIG. 5 is a diagrammatic cross-section through a twin-rotor engine accordng to the invention, FIG. 6 is a diagrammatic part cross-section through an engine being a modification of the engine shown in FIG. 5 and FIG. 7 is a diagrammatic part cross-section through an engine being a further modification of the engine shown in FIG. 6.

The general construction of the engine, which is of the so-called Wankel type, is shown in FIGS. 1 and 2. The stationary engine housing comprises a centre housing 1 which has a two-lobed epitrochoidal bore 2 therethrough, and two end plates 3 and 4. A rotor 5 is rotatably mounted by a bearing 18 on an eccentric journal 6 of a mainshaft 7 which is rotatably mounted in bearings 12 and 13 mounted in end plates 3 and 4 respectively and has a flywheel 19 and a balance weight 20 secured to its opposite extremities. Sealing strips 8 carried at the apices of the rotor maintain sealing contact with the peripheral wall 9 of the epitrochoidal bore 2 as the rotor 5 rotates in planetary manner within said bore and form three working chambers 34. Air or fuel/air mixture is inducted into the working chambers 34 through an inlet port 35 and spent gases are exhausted through exhaust port 36. The rotor 5 has an internally toothed ring gear 10 which meshes with an externally toothed fixed gear 11 carried by the end plate 4 and the ring gear 10 controls the planetary motion of the rotor which rotates once for every three revolutions of the mainshaft 7.

The induction system of the engine is such that air flows through and cools the rotor and air passes in sequence through an inlet 14, a passage 15 and an opening 16 in the end plate 3, openings 17 in the apex portions of the rotor, and through an opening 21 in the end plate 4. The inducted air also flows through an aperture 26 in the eccentric journal 6 which is thereby cooled.

In a conventional arrangement the air would flow directly from opening 21 in end plate 4 to an inlet port to the working chamber of the engine through a transfer passage formed in the end plate 4 but in the engine according to the invention a passage 22 in the end plate 4 communicates with the opening 21 and is connected by a pipe 23 to a chamber 24 which is in turn connected by a pipe 25 to the inlet port 35.

The chamber 24, which has an internal volume preferably at least equal to the volumetric displacement of the engine, acts as an air reservoir as hereinbefore described to provide a less restricted air flow, and hence better volumetric efficiency, particularly when the engine is operating at high load.

Fuel may be dispensed into the inducted air flow by means of a carburettor either before the air passes into the inlet 14 such that it is an air/fuel mixture which flows through the rotor or as the air flows through the pipe 25 from the chamber 24 or alternatively may be metered directly into the working chamber by fuel injection means. In addition it is customary to dispense oil into the inducted air flow in order to lubricate the bearings 12, 13 and 18, the ring gear 10 and the seals between the side walls of the rotor 5 and the end plates 3 and 4.

The embodiment shown in FIG. 3 is a modification of the engine shown in FIG. 1 and differs in that the chamber 24 is provided with a valve 28 which is mechanically linked by a linkage system 28' to a throttle valve of carburettor 27. The linkage system 28' is such that the valve 28 opens when the engine is operting at full power with the carburettor throttle valve fully open and allows air to flow directly into the chamber 24 from atmosphere to augment the air flow through the rotor.

An alternative means of obtaining an additional air supply at full load is shown in FIG. 4 which shows the provision of a spring loaded valve 29 which is adapted to open to admit air directly from atmosphere when the negative pressure within the chamber 24 exceeds a predetermined value of, for example, 10 inches of Water Gauge.

The invention is applicable to multi-rotor engines and FIG. 5 shows a twin rotor engine according to the invention. This engine which is essentially of the same basic construction as the single rotor engine shown in FIG. 1, has two centre housings 1 which are joined together by an intermediate plate 30 which forms the end walls of the adjacent ends of the epitrochoidal bores 2 formed in the two centre housings 1. End plates 3 and 4 complete the housing and form end walls of the two outside ends of the epitrochoidal bores 2. A rotor 5 is rotatably mounted within each of the two centre housings 1 and each is mounted on an accentric journal 6 on the mainshaft 7. The intermediate plate 30 has an air inlet passage 37 formed therein and air inducted into the working chambers of the engine flows through the inlet passage 37, the passageways 17 in the rotors 5, the passageways 22 in the end plates 3 and 4, the pipes 23 connected to the passageways 22, the air reservoir chambers 24 and the pipes 25 connecting the air reservoir chambers 24 to the inlet ports of the engine. The induction passages to the working chambers associated with each rotor are independent of each other, apart from the common air inlet 37, and each is substanitally identical with the induction passage of the single rotor engine shown in FIG. 1. The engine shown in FIG. 6 is a modification of that shown in FIG. 5 and the arrangement of the component parts of the housing, the rotors and the air passages formed therein is identical with that of the engine shown in FIG. 5. This engine differs in that, instead of having separate reservoir chambers 24 each associated with an independent induction passage, it has a common air reservoir chamber 31 which is connected by the two pipes 23 to both of the passages 22 in the end plates 3 and 4 and by the two pipes 25 to both of the inlet ports to the working chambers of the engine. The induction passages to the working chambers associated with each rotor are not therefore independent of each other but are interconnected by the common air reservoir chamber 31.

It has been found with a particular twin rotor engine that the torque characteristics of the engine are superior below a certain engine speed when separate air reservoir chambers are used, as shown in FIG. 5, but that the torque characteristics are superior above said engine speed when the engine has a common air reservoir chamber, as shown in FIG. 6. It is therefore advantageous to arrange that the air reservoir chamber be interchangeable between the separate and the common air reservoir chamber configurations in order to obtain optimum torque characteristics throughout the engine speed range. One way of achieving this is to use the arrangement shown in FIG. 7 in which the arrangement shown in FIG. 5 is modified by the provision of a duct 32 interconnecting the two air reservoir chambers 24 and a valve 33 which is actuable to open and close the duct 32. The actuation mechanism for the valve 33 is adpated to open the valve 33 when the engine is operating at or above a predetermined speed, under which conditions a common air reservoir is formed. A device 40 is provided connected to the engine by means (not shown) to be responsive to engine speed, and an operating linkage 41 is provided between device 40 and valve 33. When the engine is operating below the predetermined speed the valve 33 closes the duct 32 and under these conditions two separate air reservoir chambers are formed.

It should be noted that the above described variation in torque characteristics with air reservoir chamber configuration has been observed only with one particular engine which I have tested and it may be that this phenomenum does not occur with other engines. The choice between using separate, common or combined common/separate air reservoir chamber arrangements should therefore be determined in each case by experimentation.

What I claim is:

1. A rotary piston internal combustion engine comprising housing means, at least one cavity formed within the housing means, a rotor rotatably mounted within the cavity, the peripheral wall of the cavity and the rotor being so shaped that working chambers are formed therebetween which vary in volume as the rotor rotates, an inlet port and an exhaust port in the housing means whereby gases may be respectively admitted to and exhausted from the working chambers, an air passageway in the housing means, at least one air passageway through the rotor which communicates with the air passageway in the housing means, and means secured to the housing means providing air reservoir chamber means with an internal volume which is greater than the volumetric displacement of the engine and which communicates with the air passageway in the housing means and with the inlet port whereby air inducted into the working chambers passes in sequence through the passageway in the rotor, the passageway in the housing means, the air reservoir chamber means and the inlet port.

2. A rotary piston internal combustion engine according to claim 1 comprising housing means having a plurality of cavities, a rotor rotatably mounted in each cavity, a number of air reservoir chambers equal to the number of cavities, and an induction passage to the working chambers associated with each rotor constituted by air passageway in the housing means, at least one air passageway through the rotor communicating with the air passageway in the housing means and an air reservoir chamber communicating with the air passageway in the housing means and with the inlet port to the working chambers.

3. A rotary piston internal combustion engine according to claim 1 comprising housing means having a plurality of cavities, a rotor rotatable in each cavity, a single air reservoir chamber, and induction passages to the working chambers associated with the rotors constituted by at least one air passageway through each rotor, a plurality of air passageways in the housing means each communicating with an air passageway through a rotor, and the single air reservoir chamber communicating with the plurality of air passageways in the housing means and with the inlet ports to the working chambers.

4. A rotary piston internal combustion engine according to claim 3 wherein the single air reservoir chamber has one or more valves arranged and adapted, when closed, to divide the air reservoir chamber into a number of compartments equal to the number of cavities, each compartment communicating with a single air passageway in the housing and with the inlet port to the working chambers formed by the associated rotor.

5. A rotary piston engine according to claim 4 wherein the valve or valves are actuated by actuation means which are adapted to open and close the valve or valves in response to the speed of revolution of the engine.

6. A rotary piston engine according to claim 1 comprising an opening in the air reservoir chamber means communicating with atmosphere and a valve adapted to open and close said opening.

7. A rotary piston engine according to claim 6 wherein the valve is actuated by a mechanical linkage arrange to move co-operatively with a throttle valve of a carburettor of the engine.

8. A rotary piston engine according to claim 6 wherein the valve is pressure responsive and is adapted to open when the negative air pressure within air reservoir chamber means exceeds a predetermined value.

9. A rotary piston engine according to claim 1 wherein the internal volume of the air reservoir chamber means is greater than twice the volumetric displacement of the engine.

10. A rotary piston engine as defined in claim 1, wherein said air reservoir chamber means is external with respect to said engine and is connected to said air passageway in said housing and said inlet port by separate external conduits.

11. A rotary piston engine as defined in claim 1, wherein means is provided whereby fuel may be dispensed into the induced air supplied to the working chambers.

12. The rotary piston engine defined in claim 1, wherein a second cavity is formed in said housing means and a rotor is mounted in said second cavity, separate air passageways are provided in the housing means providing separate communication of the cavities with the air reservoir chamber means, separate inlet ports are provided for each cavity, and separate communication is provided between each inlet port and said air reservoir chamber means.

13. The rotary piston engine defined in claim 12, wherein said housing means comprises a wall common to both cavities and containing an air inlet passage connected to both cavities.

14. The rotary piston engine defined in claim 12, wherein said air reservoir chamber means comprises two separate air reservoir chambers, one for each cavity.

15. The rotary piston engine defined in claim 12, wherein said air reservoir chamber means comprises a single chamber connected to both cavities.

* * * * *